(12) United States Patent
Daerr et al.

(10) Patent No.: US 10,078,009 B2
(45) Date of Patent: Sep. 18, 2018

(54) PULSE PROCESSING CIRCUIT WITH CORRECTION MEANS

(71) Applicant: KONINKLIJKE PHILIPS N.V., Eindhoven (NL)

(72) Inventors: Heiner Daerr, Hamburg (DE); Klaus Juergen Engel, Veldhoven (NL); Christoph Herrmann, Aachen (DE); Roger Steadman Booker, Aachen (DE); Ewald Roessl, Henstedt-Ulzburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 375 days.

(21) Appl. No.: 14/784,979

(22) PCT Filed: Apr. 17, 2014

(86) PCT No.: PCT/EP2014/057907
§ 371 (c)(1),
(2) Date: Oct. 16, 2015

(87) PCT Pub. No.: WO2014/173812
PCT Pub. Date: Oct. 30, 2014

(65) Prior Publication Data
US 2016/0076935 A1    Mar. 17, 2016

(30) Foreign Application Priority Data

Apr. 24, 2013    (EP) .................................... 13165032

(51) Int. Cl.
*G01J 1/44*    (2006.01)
*G01T 1/17*    (2006.01)
*G01T 1/24*    (2006.01)

(52) U.S. Cl.
CPC .............. *G01J 1/44* (2013.01); *G01T 1/171* (2013.01); *G01T 1/24* (2013.01); *G01T 1/247* (2013.01)

(58) Field of Classification Search
CPC .......... G01J 1/44; G01J 1/42; G01J 2001/442; G01T 1/17; G01T 1/171; G01T 1/24; G01T 1/247
See application file for complete search history.

(56) References Cited

U.S. PATENT DOCUMENTS 4,152,596 A * 5/1979 Marshall, III ....... G01N 23/222
250/358.1
4,634,863 A    1/1987 Schwartz
(Continued)

FOREIGN PATENT DOCUMENTS

EP    0396464 A2    11/1990
EP    2541280    1/2013
(Continued)

OTHER PUBLICATIONS

Auricchio, N., et al.; Twin Shaping Filter Techniques for Compensating the Signals in CZT/CdTe Detectors; 2004; IEEE Nuclear Science Symposium Conference; pp. 4461-4465.
(Continued)

*Primary Examiner* — John Lee (57) ABSTRACT

The invention relates to a method and a pulse processing circuit (100) for the processing of current pulses (CP) generated by incident photons (X) in a piece of converter material, for instance in a pixel (11) of a radiation detector. Deviations of the pulse shape from a reference are detected and used to identify pulse corruption due to pile-up effects at high count rates and/or charge sharing between neighboring pixels. The deviation detection may for instance be achieved by generating, with a pulse shaper (110), bipolar
(Continued)

shaped pulses from the current pulse (CP) and/or two shaped pulses of different shapes which can be compared to each other.

15 Claims, 5 Drawing Sheets

(56) References Cited

U.S. PATENT DOCUMENTS

| | | | |
|---|---|---|---|
| 4,658,216 A | 4/1987 | Goulding et al. | |
| 5,021,664 A | 6/1991 | Hinshaw | |
| 6,470,285 B1 | 10/2002 | Atwell | |
| 6,732,059 B2* | 5/2004 | Warburton | G01T 1/185 250/264 |
| 7,078,669 B2* | 7/2006 | Mikkelsen | H04N 5/3692 250/208.1 |
| 7,107,306 B2* | 9/2006 | Nikitin | G06G 7/02 708/819 |
| 7,418,469 B2* | 8/2008 | Nikitin | G06K 9/00503 708/819 |
| 7,528,377 B2* | 5/2009 | El-Hanany | G01T 1/2928 250/370.01 |
| 7,617,270 B2* | 11/2009 | Nikitin | G06G 7/02 708/801 |
| 8,350,221 B2* | 1/2013 | Steadman Booker | G01T 1/17 250/336.1 |
| 8,415,635 B2* | 4/2013 | Marks | G01T 1/171 250/370.09 |
| 8,941,076 B2* | 1/2015 | Abraham | G01T 1/171 250/336.1 |
| 8,954,300 B2* | 2/2015 | Scoullar | G01V 5/0016 703/2 |
| 9,664,797 B2* | 5/2017 | Roessl | G01T 1/171 |
| 9,759,822 B2* | 9/2017 | Daerr | G01T 1/17 |
| 9,829,377 B2* | 11/2017 | Steadman Booker | G01J 1/44 |
| 2004/0243659 A1* | 12/2004 | Nikitin | G06G 7/02 708/819 |
| 2005/0216640 A1 | 9/2005 | Drescher et al. | |
| 2006/0253512 A1* | 11/2006 | Nikitin | G06G 7/02 708/400 |
| 2008/0149842 A1* | 6/2008 | El-Hanany | G01T 1/2928 250/370.09 |
| 2008/0203313 A1 | 8/2008 | Harrison et al. | |
| 2009/0032715 A1 | 2/2009 | Mott | |
| 2009/0259709 A1* | 10/2009 | Nikitin | G06G 7/02 708/801 |
| 2010/0187432 A1 | 7/2010 | Herrmann et al. | |
| 2010/0193700 A1 | 8/2010 | Herrmann et al. | |
| 2010/0207027 A1 | 8/2010 | Marks et al. | |
| 2010/0270472 A1 | 10/2010 | Proksa et al. | |
| 2011/0098980 A1 | 4/2011 | Ouvrier-Buffet et al. | |
| 2012/0112088 A1* | 5/2012 | Abraham | G01T 1/171 250/395 |
| 2012/0121050 A1 | 5/2012 | De Geronimo | |
| 2012/0236986 A1* | 9/2012 | Schroter | G01T 1/171 378/19 |
| 2013/0146767 A1* | 6/2013 | Seino | G01T 1/17 250/336.1 |
| 2014/0231646 A1* | 8/2014 | Makino | G01T 1/17 250/336.1 |
| 2015/0063533 A1* | 3/2015 | Proksa | G01T 1/171 378/19 |
| 2016/0076935 A1* | 3/2016 | Daerr | G01T 1/171 250/214 R |

FOREIGN PATENT DOCUMENTS

| | | |
|---|---|---|
| WO | 2008146230 A2 | 12/2008 |
| WO | 2011002452 A1 | 1/2011 |
| WO | 2013006453 A1 | 1/2013 |

OTHER PUBLICATIONS

Chaplin, V., et al.; Analytical modeling of pulse-pileup distortion using the true pulse shape; applications to Fermi-GBM; 2013; Nuclear Instruments and Methods in Physics Research A; vol. 717; pp. 21-36.

Goulding, F. S., et al.; Ballistic Deficit Correction in Semiconductor Detector Spectrometers; 1988; IEEE Trans. on Nuclear Science; 35(1)119-124.

* cited by examiner

PULSE PROCESSING CIRCUIT WITH CORRECTION MEANS

CROSS-REFERENCE TO PRIOR APPLICATIONS

This application is the U.S. National Phase application under 35 U.S.C. § 371 of International Application No. PCT/EP2014/057907, filed on Apr. 17, 2014, which claims the benefit of European Patent Application No. 13165032.7, filed on Apr. 24, 2013. These applications are hereby incorporated by reference herein.

FIELD OF THE INVENTION

The invention relates to a method and a pulse processing circuit for counting current pulses that were generated by photons in a piece of converter material.

BACKGROUND OF THE INVENTION

Medical imaging apparatuses with spectrally resolved photon counting apply radiation detectors that can count the number of (typically X-ray or gamma) photons hitting the pixels of the detector and that can classify them according to their energy. This is usually achieved by converting the photons into charge, current and/or voltage pulses that can readily be counted, wherein the pulse height or integral indicates the photon energy.

One problem such detectors have to cope with is the pile-up or overlap of subsequent pulses in case of high count rates. Another problem is the splitting of generated charges between neighboring pixels. Both effects lead to erroneous interpretations in terms of counting rates and/or photon energy.

The U.S. Pat. No. 4,658,216 discloses an approach to deal with the pile-up problem by converting current pulses into two pulses of different time constants, wherein the shorter pulse is processed by a pile-up rejector such that evaluation of the longer pulses is inhibited in case of pile-up.

The WO 2008/146230 A2 discloses an apparatus in which the heights of pulses generated by incoming X ray photons are compared to thresholds to count them in different energy bins. In parallel, the maxima of the pulses are detected. If the temporal distance between maxima is within a short time window, this is taken as an indication of pile-up, and the associated contributions to the energy bins are disregarded.

The EP 0 396 464 A2 discloses a nuclear spectroscopy method in which pulses generated by gamma rays are continuously converted into digital samples. A pulse pile-up is assumed if the number of digital samples exceeds a given maximum count.

Furthermore, a theoretical analysis about how pile-up affects the spectrum in a gamma ray detector has been described in literature (CHAPLIN V.: "Analytical Modeling of pulse-pileup distortion using the true pulse shape; applications to Fermi-GBM", NUCL. INST. AND METH. IN PHYSICS RESEARCH A, vol. 717, 2013-04-06, pages 21-36)).

The U.S. Pat. No. 4,634,863 A discloses a pulse processing-circuit that processes the trailing portion of a pulse differently from the rising portion, allowing for a better separation of ensuing pulses.

SUMMARY OF THE INVENTION

Based on this background it would be desirable to provide means that allow for a more accurate detection of photons, particularly of high-energy photons such as X-ray or gamma photons.

This object is achieved by a pulse processing circuit according to claim 1, a method according to claim 2, and a radiation detector according to claim 15. Preferred embodiments are disclosed in the dependent claims.

Pulse processing circuits according to embodiments of the invention serve for counting current pulses that were generated by photons in a piece of converter material and sensed at an electrode. In a basic embodiment of the invention, such a pulse processing circuit comprises a detection module for the detection of at least one deviation of the shape of a current pulse from a reference, said deviation being caused by the pile-up of subsequent current pulses and/or by partial (i.e. incomplete) charge collection at the electrode ("charge sharing").

The aforementioned current pulse is typically generated when a photon such as an X-ray or gamma photon interacts with a suitable converter material, wherein its energy is used to generate electron-hole pairs in the conduction resp. valence band of the material. Driven by an electrical field, the generated charge cloud moves to electrodes adjacent to the converter material, where it induces an associated current pulse (or charge pulse). This current pulse will typically have the shape of a single (unipolar) peak with a more or less pronounced tail.

The "reference" with respect to which a deviation of the shape of the current pulse is detected will usually comprise a set or a range of different shapes (templates) that are considered as representing "normal" or "standard" current pulses unaffected by pile-up or partial charge collection. The reference may for example be described by some model curve depending on one or more parameters (e.g. pulse height, time constant etc.) that may be selected from a given interval.

The invention further relates to a method for counting current pulses that were generated by photons in a piece of converter material and sensed at an electrode, said method comprising the detection of at least one deviation of the shape of the current pulse from a reference caused by pile-up of subsequent current pulses and/or by partial charge collection at the electrode.

The method comprises in general form the steps that can be executed with the pulse processing circuit described above. Explanations provided for the circuit are therefore analogously valid for the method and vice versa. The method may particularly be executed with the help of the described pulse processing circuit.

The described pulse processing circuit and method allow for the detection of two important sources of errors in photon counting detectors, namely pile-up and charge sharing between pixels. This is based on the insight that said effects leave characteristic traces in the shape of the generated current pulses and that said traces can be detected by comparing the current pulses with a suitable reference.

In the following, various preferred embodiments of the invention will be described which can be realized in combination with both the above pulse processing circuit and the method (even if they are explained only with respect to one of them).

In a preferred embodiment of the invention, a current pulse is transformed into at least one shaped pulse. The pulse processing circuit may comprise a subunit called "pulse shaper" for this purpose. The shaped pulse may for example be a voltage pulse that can more readily be processed (counted, energy discriminated etc.) by subsequent electronics than the original current pulse. It should be noted, however, that the shaped pulse may also just be an identical copy of the current pulse.

There are many ways how the generation of shaped pulses can be achieved. In a preferred embodiment, the generation is such that it amounts to or comprises a convolution of the original current pulse with some given convolution kernel, e.g. with a Gaussian function or a bipolar function.

In one preferred basic embodiment of the invention, the current pulse is transformed or can be transformed (e.g. with the above mentioned pulse shaper) into a shaped pulse having at least two (local) extremes (i.e. maxima and/or minima). A preferred example of such a shaped pulse is a bipolar pulse that has both a positive and negative excursion with respect to its resting value (the latter typically being defined as "zero"), or, with other words, a maximum and a minimum. A bipolar shaped pulse may for example be generated from a unipolar current pulse by convolution with a bipolar kernel. The bipolar pulse preferably has a positive and a negative pulse height of equal (absolute) height.

An advantage of the usage of shaped pulses with several extremes is that they simultaneously allow for a high temporal resolution (which is usually determined by the width of the extremes) and a good energy resolution (which is usually determined by the pulse height and/or the integral of the pulse). Thus pile-up of pulses can be detected and corrected for up to high count rates without compromising energy determination.

The height of the shaped pulses may preferably be determined with respect to at least one positive threshold and at least one negative threshold, particularly if the above mentioned bipolar shaped pulses are used.

The number of extremes of the above mentioned shaped pulse is a parameter of the pulse shape that can readily and unambiguously be determined. In a preferred embodiment, the number of extremes of "normal" shaped pulses may therefore serve as a reference with respect to which a deviation of a shaped pulse at hand is detected. Shaped pulses which do not have the reference number of extremes may thus be considered as being affected by pile-up and/or charge sharing.

According to a second preferred basic embodiment of the invention, the current pulse is transformed or can be transformed (e.g. by the above mentioned pulse shaper) into at least two shaped pulses of different shapes. Such a transformation may be helpful to more readily determine shape deviations of the original current pulse, particularly in case of charge sharing. It should be noted in this context that two pulses are considered as being of "different shapes" if they are not identical after pulse height normalization. A different scaling of the time axis will therefore by definition yield pulses of different shapes.

In an optional further development of the aforementioned embodiment, a relation between at least two characteristic parameters of the shaped pulses is determined. Such a relation or comparison often provides a very sensitive means for the detection of deviations in the shape of the original current pulse. Moreover, a relation is often independent of influences (e.g. the photon energy) that are of no interest for the intended shape deviation detection.

The mentioned at least two characteristic parameters may for example comprise at least one of a pulse height of a shaped pulse, a value of a shaped pulse at a given point in time, a temporal interval or a point in time of a shaped pulse, or an integral of a shaped pulse. The relation may for example compare the pulse heights of two unipolar shaped pulses, or their pulse width. The relation may particularly be a quotient or a difference between two characteristic parameters, e.g. a quotient between the pulse heights of a detected shaped pulse and of a reference shaped pulse.

In the above embodiment, a deviation of the shape of a current pulse from a reference may preferably be detected if the relation between said characteristic parameters of the shaped pulses generates a value which is outside a specified range around a reference value deduced from a reference current pulse. The size of the range around the reference value can for instance be specified according to the expected variance in the shapes of (reference) pulses.

In the aforementioned embodiment, at least two of said characteristic parameters may for example be a pulse height or a pulse value at a given point in time, and said relation between said characteristic parameters may be a quotient. Or, in another embodiment, at least two of said characteristic parameters may be the time to which a pulse maximum occurs, and said relation between the characteristic parameters is a temporal interval (particularly the temporal interval between these times of pulse-maxima).

In another embodiment of the invention, at least one pulse height of the current pulse and/or of a shaped pulse derived from the current pulse is determined. The value of this pulse height will often provide important information about the photon that generated the current pulse, for example its energy. Additionally or alternatively, at least one (temporal) integral of the current pulse and/or of a shaped pulse may be determined.

The current pulses may preferably be counted (either directly or indirectly via counting shaped pulses generated therefrom). The processing circuit may be provided with a particular subunit ("counter") for this purpose. Such a counting may preferably take place in a spectrally resolved way, i.e. current pulses belonging to photons of different energies (or energy intervals) are counted separately in respective "energy bins".

In the aforementioned embodiment, the number of counted current pulses (or photons) is preferably corrected by taking detected deviations of shape into account, particularly deviations of shape that are due to pulse pile-up. In case of pulse pile-up, two or more overlapping pulses may for example erroneously be counted as a single pulse. Such an underestimation of the actual count rate may be corrected for if it is known how many current pulses are affected by pile-up. In case of charge sharing between neighboring pixels, a single photon may be counted twice (or even more often) in neighboring pixels, leading to an overestimation of the actual count rate. If a deviation of shape of the current pulses indicates such a situation of charge sharing, count rates may hence be revised downwards (e.g. by subtracting half of the number of detected deviations in each involved pixel).

In general, at least one counter may optionally be provided for counting current pulses for which a deviation of the shape from a reference has been detected. The information provided by this counter may then particularly be used to deduce a corrected total count rate of photons.

When the photon energy is determined from the current pulses, then this value may be corrected by taking detected deviations of shape into account, particularly deviations of shape that are due to partial charge collection (i.e. "charge sharing"). If the current pulse shape indicates for example the occurrence of charge sharing between neighboring pixels, the energy values derived from these pulses may be excluded from further evaluation.

The invention further relates to a radiation detector comprising:

A converter with at least one piece of converter material for converting incident photons into current pulses at an electrode.

A pulse processing circuit of the kind described above. i.e. with a detection module for the detection of at least one deviation of the shape of a current pulse from a reference, said deviation being caused by the pile-up of subsequent current pulses and/or by partial charge collection at the electrode. The pulse processing circuit is connected to the aforementioned electrode to receive current pulses therefrom.

The pieces of converter material of the converter will usually be arranged in a one- or a two-dimensional array and correspond to the pixels of an image that can be generated with the radiation detector. The radiation detector may particularly be applied in an imaging apparatus for generating radiation images of an object, particularly X-ray projections. The imaging apparatus may for example be designed as a Computed Tomography (CT) apparatus or scanner in which projection images of the object are generated from different viewing angles, allowing for a reconstruction of sectional or volumetric images of the object. Most preferably, the imaging apparatus may be a photon counting spectral (i.e. energy-resolved) CT scanner.

BRIEF DESCRIPTION OF THE DRAWINGS

These and other aspects of the invention will be apparent from and elucidated with reference to the embodiments described hereinafter.

In the drawings.

Like reference numbers or numbers differing by integer multiples of 100 refer in the Figures to identical or similar components.

DETAILED DESCRIPTION OF EMBODIMENTS

Figure 1:
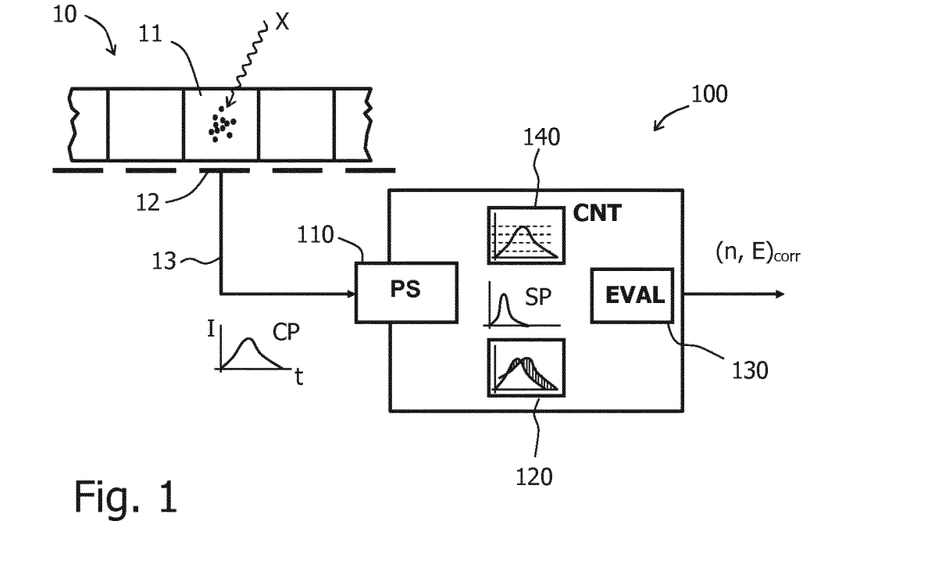
FIG. 1 schematically shows a generic embodiment of a processing circuit according to the present invention.

FIG. 1 schematically illustrates a radiation detector with a pulse processing circuit 100 according to an embodiment of the present invention. This circuit may for example be realized by an ASIC. The radiation detector further comprises a converter 10 with a plurality of pieces 11 of converter material (e.g. CdTe or CZT) or "pixels" in which incident photons X of X-ray or gamma-radiation are converted into clouds of movable electrical charges. These charges can be collected at electrodes 12 on a surface of the converter 10, thus generating a current pulse CP (or "charge pulse") in an associated signal line 13. The electrodes 12 are typically anodes, and a single cathode (not shown) is usually disposed on the converter 10 opposite to the anodes.

The aforementioned signal line 13 is connected (preferably via an intermediate charge sensitive amplifier CSA, not shown) to a pulse shaper 110 of the pulse processing circuit 100 which converts the current pulse CP into a secondary pulse called "shaped pulse" SP in the following. The shaped pulse SP may for example be a voltage pulse with a pulse height that is (at least approximately) proportional to the temporal integral of the current pulse (i.e. to the charge generated by the incident photon X and thus to the photon energy). This pulse height is compared to a set of thresholds in a discrimination-and-counting circuit 140 of the pulse processing circuit 100, where the counts in respective energy bins are increased.

Without additional measures, the setup and procedure of spectrally resolved photon counting described so far faces the following problems:

Ideal current pulse integration is not possible in practice, as it would require long integration times such that other pulses can contaminate the result during the integration period (known as "pulse pile-up"). Therefore, the pulse shaping will not be sensitive to the current pulse as a whole; instead, a current pulse component is weighted the lower the farer it is distant (on the time axis) from the pulse center. The shaped pulse can be well approximated by the convolution of the current pulse with a pulse shaping function which typically is a Gaussian function.

An advantage of pulse shaping is thus that even partly overlapping different current pulses can be separated from each other if they are not too close to each other in the time domain. A disadvantage however is that especially broader current pulses are evaluated with too low energies (an effect which is often referred to as "ballistic deficit").

A largely deteriorating effect for pixelated photon counting detectors is the "charge sharing" effect between neighboring pixels, which happens if a photon creates charge clouds near the pixel borders. As charge clouds expand by a few tens of microns before they reach the anode plane, it might happen that a part of the charge cloud is collected by one pixel, and another part is collected by a neighboring pixel. Instead of a single count in one pixel, two different counts for each involved pixel will then be registered, each representing only a part of the original energy. Charge sharing creates a "low energy tailing" in the spectral response of the detector, i.e. for monochromatically incident energies each pixel measures a spectrum which shows not only a photo peak (representing "good" counts with correctly identified energies) but also "bad" counts distributed over the whole lower energy range. The low energy tailing largely affects the signal-to-noise ratio for e.g. material separation algorithms, and much higher image quality can potentially be achieved if the charge sharing events can be identified.

Moreover, the spectral performance and the capability to determine the correct number of incoming photons degrades due to the above mentioned pulse pile-up with increasing flux, i.e. at high count rates. Pile-up occurs intrinsically inside the X-ray detector 10 but also inside the counting electronics 100. It is therefore also desirable to have means to better deal with pile-up characteristics of the counting electronics.

If the shaped pulses generated by the pulse shaper 110 are unipolar, the pulse height may be determined by using a few thresholds with the same polarity. As soon as the rate increases to a level at which it is likely that pulses overlap, the number of counted events will however decrease and the detected spectrum will be distorted.

This degradation of photon counting due to electronically introduced pile-up can be affected by shortening the pulse width (dead time) of the shaped pulses, i.e. by reducing the shaping time constant. This constant can however not be chosen arbitrarily short as it also determines the accuracy of the pulse height which is the measure for the energy of the incoming photon (ballistic deficit), meaning that trade-offs between the amount of pile-up and accuracy in energy discrimination need to be considered.

FIG. 1 schematically illustrates the basic approach that is proposed here in order to deal with the described problems of pile-up and charge sharing. The approach is based on a more detailed analysis or consideration of the shapes of the current pulse CP and/or the shaped pulse SP that is derived from this. This means that the current pulses CP or the shaped pulses SP are not merely counted and classified with respect to their pulse height, but that at least one further characteristic parameter of the pulse shape is determined and compared with "a reference", i.e. a predetermined set or range of reference values. Thus a possible deviation from this reference can be detected that comprises information about a distortion of the processed pulse by pile-up and/or charge sharing. With this information at hand, an evaluation module 130 of the pulse processing circuit 100 may optionally correct the originally determined values of pulse energy E and of pulse counts n, providing corrected values $(n, E)_{corr}$ at the output of the processing circuit. This general approach will in the following be described in more detail with respect to specific embodiments illustrated in the other Figures.

Figure 2:
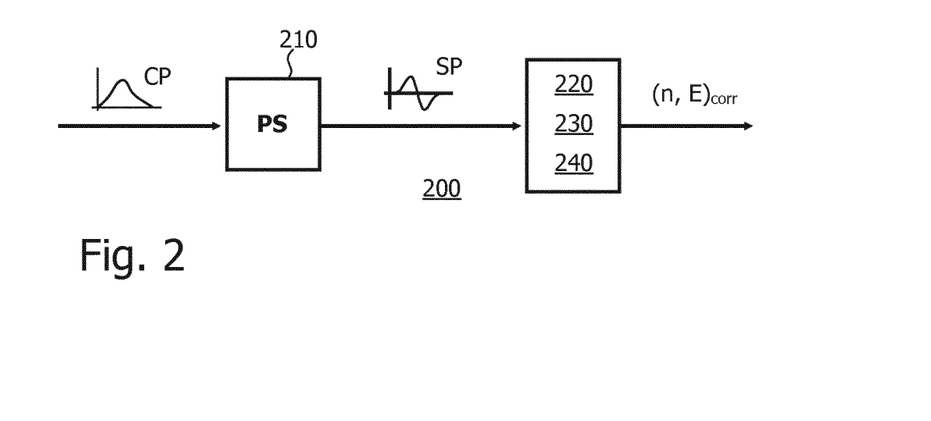
FIG. 2 schematically shows an embodiment of the processing circuit of FIG. 1 in which bipolar shaped pulses are generated.

In FIGS. 2-5, a first embodiment is illustrated that is particularly suited for dealing with the problem of pulse pile-up at high count rates. FIG. 2 schematically shows the associated pulse processing circuit 200, for example realized as an ASIC. The pulse processing circuit 200 includes a CSA (not shown) followed by a specific pulse shaper 210 that transforms the original current pulse CP into a shaped pulse SP.

The shaped pulse SP is forwarded to an integrated spectral counting and correction module 220, 230, 240 comprising several comparators with the possibility to apply positive or negative thresholds. The combination of CSA and pulse shaper is capable to produce bipolar pulses SP with comparable positive and negative pulse heights. Furthermore, a logic unit processing the comparator signals and a data storage unit are included. The logic should be able to determine the number of events contributing to one pulse train and to identify the pulse heights.

A central aspect of this embodiment is the idea to use a shaped pulse SP with the same shaping time constant as usual but with a bipolar pulse shape with comparable positive and negative pulse heights, and further to use comparators with positive and negative thresholds for evaluating this shaped pulse.

The pulse height can then be measured using the positive pulse height and positive thresholds as well as detecting the negative pulse height using negative thresholds. This redundancy is canceled when pile-up occurs and the pulse height of the temporally first pulse can be measured using the positive thresholds, while the pulse height of the second pulse is detected by the negative thresholds.

Figure 3:
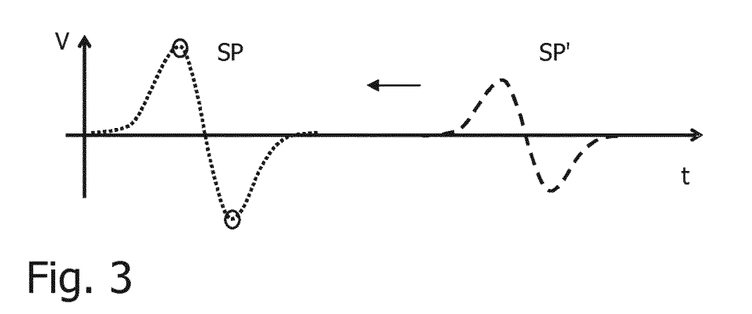
FIG. 3 shows two non-overlapping bipolar shaped pulses.
Figure 4:
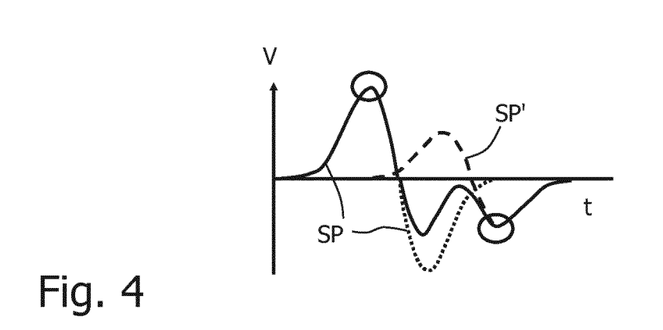
FIG. 4 shows two partially overlapping bipolar shaped pulses.

FIGS. 3 and 4 illustrate this for two exemplary bipolar shaped pulses SP and SP'. FIG. 3 shows the situation at a low count rate. The two pulses SP and SP' are separate from each other and can be individually evaluated, i.e. they can be counted and their (positive or negative) pulse height (cf. circles) can be classified.

Due to its bipolar nature (or, more generally, due to the existence of more than one extreme), the shaped pulses have a structure with finer temporal details than a single unipolar pulse. A part of this structure is preserved if two pulses run into each other at increasing count rates.

This is illustrated in FIG. 4, where the minimum of a first bipolar pulse SP and the maximum of a second bipolar pulse SF overlap to yield a superposed pulse (solid line) of a more complicated shape. The maximum of the first pulse SP and the minimum of the second pulse SP' are however still detectable at substantially unaffected. It is therefore possible to identify the two pulses SP and SP' in the superposed curve and even to determine their pulse heights (from the maximum of the first pulse SP and the minimum of the second pulse SP') in spite of their partial overlap. In the shown case the highest negative thresholds count two events. Thus the right number of events is directly measured by the negative thresholds.

It should be noted that this reasoning and approach can similarly be applied to a more general pulse shape having a plurality of extremes.

Figure 5:
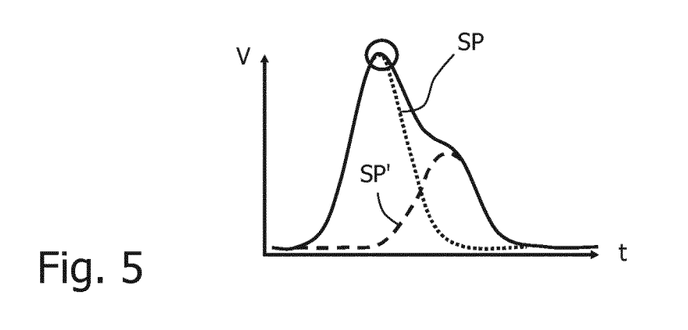
FIG. 5 shows overlapping unipolar shaped pulses.
Figure 6:
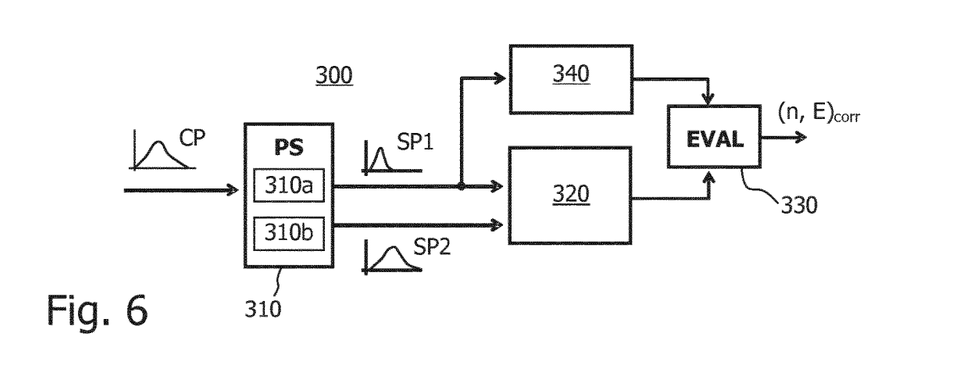
FIG. 6 schematically shows an embodiment of the processing circuit of FIG. 1 in which two shaped pulses of different shapes are generated in parallel and compared to each other.

FIG. 5 illustrates a situation of high count rate for two overlapping unipolar pulses with the same pulse width as the bipolar pulses from FIGS. 3 and 4. Here a single peak (solid line) results that will wrongly be interpreted as a single pulse of increased pulse height.

To summarize, the effective pulse width at which pile-up occurs leading to errors in counting and energy discrimination of the incoming current pulses can be shortened roughly by a factor of two while maintaining the same level of ballistic deficit compared to a system using an unipolar pulse shape with the same shaping constant. The described embodiment comprises of an ASIC for photon counting which uses a bipolar pulse shape and positive as well as negative thresholds. Such a device has better counting and spectral performances compared to an ASIC with an unipolar pulse shape and positive thresholds only. Better counting and spectral performances means that the system has the capability to determine the number of real events and their pulse height in a more accurate way. The approach can particularly be applied to spectral detector systems with dedicated readout ASICs to be operated in applications with high X-ray flux like spectral computed tomography.

FIGS. 6-11 illustrate a second embodiment of the invention that is particularly suited to deal with charge sharing. "Bad" current pulses (affected by charge sharing) differ from "good" ones (not affected) by the current pulse envelopes, meaning that also shaped pulses will show different heights and different timings with respect to the current pulse maximum. The basic idea of this embodiment is to use a pulse shaper ensemble 310 with two individual pulse shapers 310a, 310b per pixel instead of one, each individual pulse shaper having different pulse shaping properties (e.g. different timing constants or different shaping envelopes). Each incoming current pulse thus creates two shaped pulses SP1 and SP2 with different pulse shapes. Also, the shaped pulse maxima might show a time difference to each other. An associated detection module 320 can then use the ratio of the shaped pulse heights and/or their time difference to distinguish "good" pulses from "bad" pulses. Moreover, one of the shaped pulses (SP1) is in parallel processed by a discriminator-and-counter 340. The results of the detection module 320 and the discriminator-and-counter 340 are combined in an evaluation module 330 to determine corrected values (n,E)$_{corr}$ for pulse counts n and photon energy E.

Figure 7:
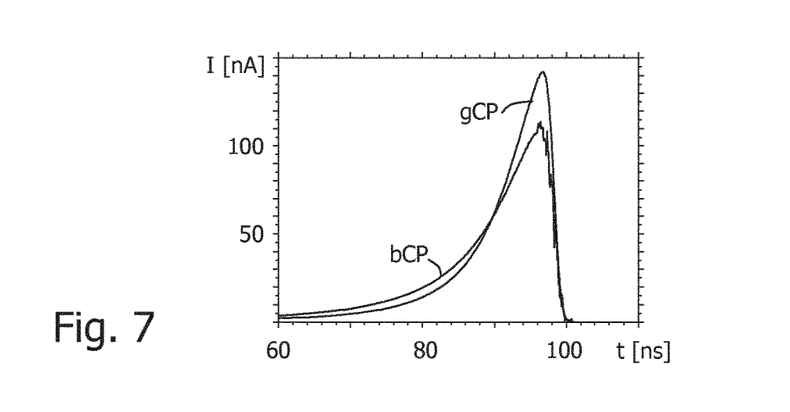
FIG. 7 shows a "good" and a "bad" current pulse generated without and with charge sharing, respectively.

To further illustrate the aforementioned approach, FIG. 7 shows a simulated "good" current pulse gCP and a simulated "bad" current pulse bCP. The "good" pulse is induced by a 40 keV photon which deposits its complete charge near the cathode above the pixel center; for this pulse, no charge sharing or other significant charge losses are expected, such that this pulse acts as a reference for a "good" pulse in the following. The "bad" pulse is the result of an 80 keV photon which created an electron cloud near the cathode above a border between two pixels. Due to charge cloud expansion, about 50% of the charges are registered by each of the neighboring pixels, which effectively correspond to a 40 keV equivalent measured in each pixel. Mathematically, current pulses can be expressed by a function $$I(\vec{r},E,t)=E \cdot p_{in}(\vec{r},t)$$

where E represents a deposited total charge (proportional to the photon energy) at location $\vec{r}$, and $p_{in}(\vec{r},t)$ describes the envelope of a current pulse with time t, with $\int p_{in}(\vec{r},t)dt=1$.

"Good" and "bad" pulses differ by a qualitatively different envelope $p_{in}(\vec{r},t)$, which is a result of the charge trajectories through different regions of the pixel weighting potential, respectively; "bad" pulses typically show a twice as large peripheral pulse component long before the charges are collected, while the main pulse component is lower as compared to the reference pulse. Furthermore, the "bad" pulse has typically a smoother falling edge. These mentioned characteristics for a "bad" pulse are due to the fact that shared charge is "taken away" just in the last 10 ns before the pulse ends.

The pulse shaping can be described mathematically by a convolution of the current pulse with a pulse shaping function g·f(t) where g describes an (electronic) gain i.e.

$$p_{out}(\vec{r},E,t)=g \cdot I(\vec{r},E,T) \circ f(t) = E \cdot g \cdot p_{in}(\vec{r},t) \circ f(t).$$

As explained above, two pulse shapers per pixel are in the following used simultaneously, each having a different pulse shaping function $g_1 \cdot f_1(t)$ and $g_2 \cdot f_2(t)$, respectively. Two examples are particularly examined: In the first example, Gaussian pulse shaping functions of different sigma widths of 5 ns and 20 ns, respectively, are combined. In the second example, a Gaussian pulse shaping function of 5 ns sigma width is combined with a bipolar pulse shaping function. The bipolar pulse shaping function can be seen as a kind of "edge detection" filter; it can for example be created by taking the derivative of a Gaussian pulse shaping.

Figure 8:
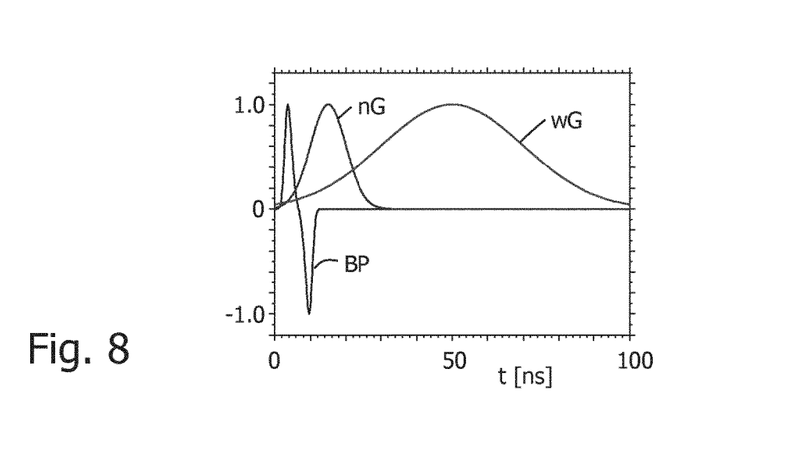
FIG. 8 shows a bipolar function, a narrow Gaussian function, and a wide Gaussian function that may be used as kernels for generating shaped pulses from the current pulses of FIG. 7.

FIG. 8 illustrates the aforementioned three examples of pulse shaping functions (convolution kernels): a narrow Gaussian function nG (σ=5 ns), a wide Gaussian function wG (σ=20 ns), and a bipolar function BP.

Figure 9:
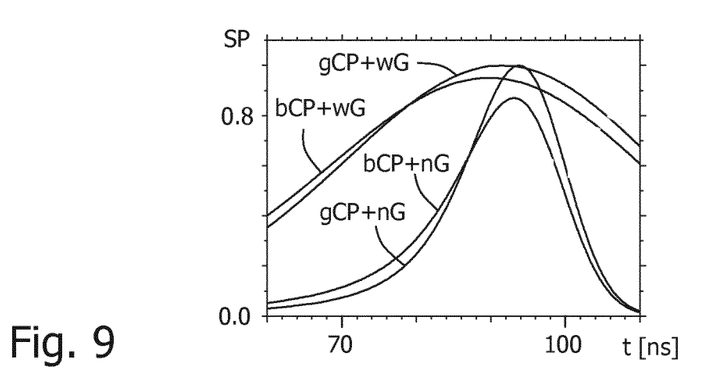
FIG. 9 shows shaped pulses derived with the two Gaussian functions of FIG. 8 from the two current pulses of FIG. 7.

FIG. 9 shows the results of applying the Gaussian pulse shaping functions nG and wG of FIG. 8 to the current pulses of FIG. 7 (wherein the nomenclature is self-explaining, e.g. curve "bCP+nG" corresponds to the convolution of the bad current pulse bCP with the narrow Gaussian nG). For convenience the normalization was chosen such that the "good" pulse maxima have unity value.

Figure 10:
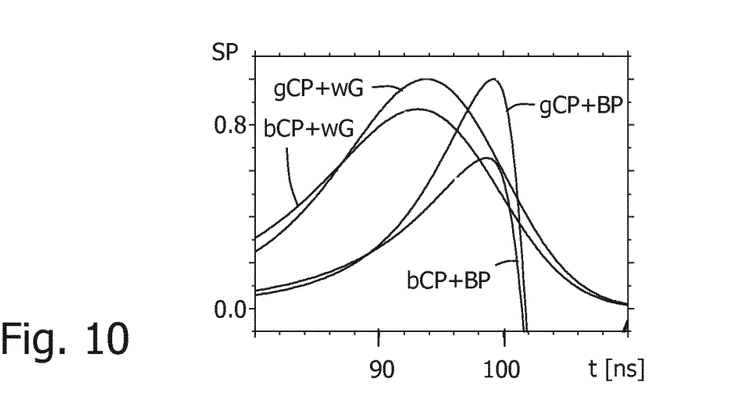
FIG. 10 shows shaped pulses derived with the wide Gaussian function and the bipolar function of FIG. 8 from the two current pulses of FIG. 7.

FIG. 10 shows the results of applying the wide Gaussian pulse shaping functions wG and the bipolar function BP of FIG. 8 to the current pulses of FIG. 7. Again, the normalization was chosen such that the "good" pulse maxima have unity value.

For each pair of shaped pulses, the pulse height ratio q is taken as a first quantity. The pulse height ratio q is $$q = \frac{p_{out,1}(E,\vec{r},t_{max1})}{p_{out,2}(E,\vec{r},t_{max2})} = \frac{g_1}{g_2} \cdot \frac{(p_{in} \circ f)(\vec{r},t_{max1})}{(p_{in} \circ f)(\vec{r},t_{max2})}.$$

It is important to note that the total charge E (i.e. the original photon energy) of the pulse cancels out by using the ratio, i.e. only the qualitative shape of the current pulse is relevant but not its pulse height. The gain of each pulse shaper generates a constant factor $g_1/g_2$.

In the following, it is assumed that $g_1$ and $g_2$ of each of the pulse shapers are calibrated such that for a "good" reference pulse the maximal height of the shaped pulse becomes unity.

As a second quantity the time difference δt between shaped pulse maxima (of the same current pulse shaped with the two different shapers) is considered. For this the value $$\Delta t_{ref}=t_{max\ 2,ref}-t_{max1,ref}$$

is taken for a "good" reference pulse and compared with the value $$\Delta t_{in}=t_{max\ 2,in}-t_{max\ 1,in}$$

of an incoming pulse. In the following, the quantity $$\delta t = \Delta t_{ref} - \Delta t$$

(i.e. a difference of a difference) is discussed which would be zero for an ideal "good" pulse.

Figure 11:
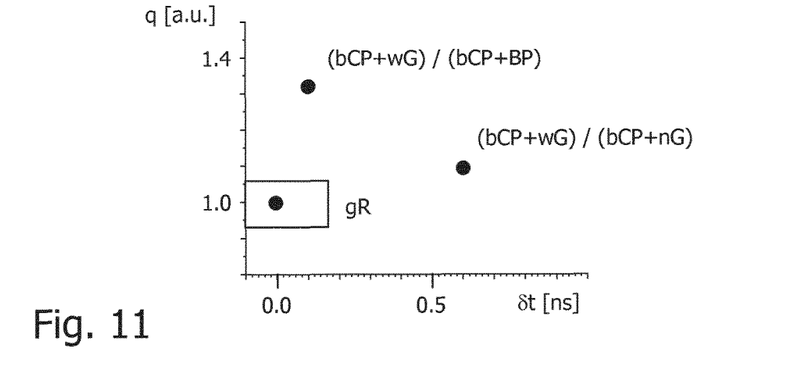
FIG. 11 shows of phase diagram of parameter ratios derived from the curves of FIGS. 9 and 10.

FIG. 11 shows a "phase diagram" containing the pulse height ratio q and the time difference δt between maxima of the shaped pulses for the pulse shaper combinations shown in FIGS. 9 and 10. In the first example (FIG. 9), the pulse height ratio q (i.e. the ratio for the 20 ns Gaussian wG with respect to the 5 ns Gaussian nG) is about 10% larger for the "bad" pulse as compared to the "good" pulse. Furthermore, there is a δt of 0.6 ns between the "good" and the "bad" pulses, respectively.

In the second example (FIG. 10), the pulse height ratio q becomes much more pronounced as a bipolar "edge" detection pulse shaping function is chosen for the second pulse shaper. In this case, q is about 30% larger for a "bad" pulse as compared to a "good" pulse, whereas the δt of about 0.1 ns is quite small.

One can use either (or both) of the measured quantities q and δt to mark a pulse as "good" or "bad" by defining a tolerance range gR around the "good" reference pulse; if the quantities for an incoming pulse are outside of the set range, it will be identified as "bad"; in this case, the pulse height information will not be evaluated. Instead, optionally a "bad pulse" counter can be increased to provide the additional information that a charge-sharing count occurred; although this information is not used for energy discrimination, it can still be used to determine a total count rate per pixel.

The described embodiment requires a modified ASIC which includes additional analogue and digital electronics per pixel to generate the required quantities. In more detail, coincidence electronics with according time constants can be used to check if the pulse maxima are within a specified time range. An analogue divider can be used to build the ratio between current pulse and shaped pulse.

To summarize, a pulse processing circuit and method have been described that can be characterized by one or more of the following features:

A device with two pulse shapers per pixel and analogue signal processing.

A device with more than two pulse shapers to get an extended "phase space" for deciding about "good" and "bad" pulses.

A device where also the original current pulse is analyzed (i.e. equivalent to any of the described embodiments where one "pulse shaper" delivers the original current pulse).

Any of the above embodiments, where for signal processing pulse height ratio(s) of the shaped pulse maxima are used.

Any of the above embodiments, where for signal processing the signal ratio(s) of the shaped pulses are used (this differs from the aforementioned embodiment as the pulse maxima are not at the same time, such that not the ratio of the pulse maxima is used, but e.g. the maximum of the signal ratio is used).

Any of the above embodiments, where for signal processing time differences between the shaped pulse maxima are used.

Any of the above embodiments, where for signal processing any combination of the described methods is used.

Any of the above embodiments, where a "bad pulse" counter is included which after identifying a bad pulse is increased to provide additional information (e.g. to determine a total count rate).

The invention can be applied in all kinds of photon counting radiation detectors based on direct conversion detectors, for example in medical imaging systems, instruments for scientific purposes, or homeland security.

Figure 12:
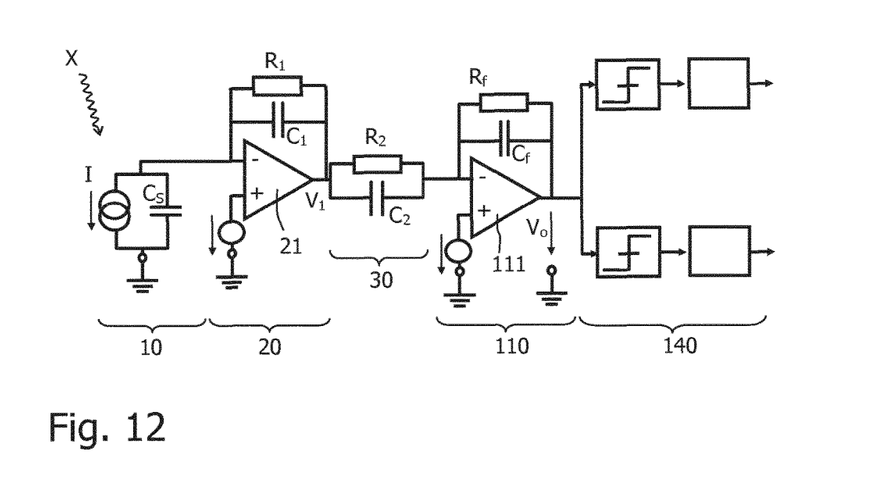
FIG. 12 schematically shows an embodiment of a pulse processing circuit with a pulse shaper.

FIG. 12 shows an exemplary circuit diagram for the pulse shaping parts of a pulse processing circuit according to the described embodiments of the invention. The depicted circuit is a single unit or "pixel" of a larger radiation detector that usually comprises several thousands of such units arranged in a two-dimensional array for generating projection images of an object (not shown).

The pixel unit comprises a (direct) conversion unit 10 in which incident X-ray photons X are converted into electrical charge signals. The conversion unit 10 is only schematically represented by its equivalent circuit comprising a current source parallel to a capacitor $C_S$.

The charge signal of the conversion unit 10 is provided to the negative input of a charge sensitive amplifier (CSA) 21 of a preprocessing unit 20. The positive input of said amplifier 21 is connected to mass, and the output voltage $V_1$ of the amplifier 21 is fed back to the negative input in parallel via a resistor $R_1$ and a capacitor $C_1$.

The output of the charge sensitive amplifier 21 is further provided to a filter 30 comprising a parallel arrangement of a further resistor $R_2$ and capacitor $C_2$ serving as a pole-zero cancellation (wherein preferably $R_2 \cdot C_2 = R_1 \cdot C_1$).

The output of the aforementioned filter 30 is connected to the (negative) input of a further amplifier 111 belonging to a pulse shaper 110. The positive input of this amplifier 111 is connected to mass, and its output voltage $V_0$ is fed back to the negative input via a parallel arrangement of a resistor $R_f$ and a capacitor $C_f$.

The pulse shaper 110 generates at its output shaped pulses with shapes (especially heights) that correspond to the energy deposited by the photon X detected in the conversion unit 10. These pulses are provided to the inputs of a set 140 of discriminators having different thresholds, such that the pulses (and thus the photon energies) are assigned to different levels or classes. In a subsequent part, a set of counters is provided, each counter being connected to the output of one discriminator for counting the pulses passing said associated discriminator.

The described pixel unit thus provides for an energy-resolved photon counting detection of incident radiation.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An application specific integrated circuit for counting current pulses that were generated by photons in a piece of converter material and sensed at an electrode, wherein the counted pulses are processed to generate a projection image, comprising:
    a first circuitry configured to transform a current pulse into a first shaped pulse having a first shape and a first characteristic parameter;
    a second circuitry configured to transform the current pulse into a second shaped pulse having a second shape and a second characteristic parameter;
    a third circuitry configured to determine a difference between the first characteristic parameter and the second characteristic parameter, thereby determining a relation between the first characteristic parameter and the second characteristic parameter;
    a fourth circuitry configured to determine a difference between a shape of a reference current pulse and a shape of the current pulse as a function of the relation between the first characteristic parameter and the second characteristic parameter; and
    a fifth circuitry configured to count a number of times the difference between the shape of the reference current pulse and the shape of the current pulse satisfies a threshold.

2. A method for counting current pulses with an application specific integrated circuit that were generated by photons in a piece of converter material and sensed at an electrode, wherein the counted pulses are processed to generate a projection image, comprising:
    transforming, with a first circuitry, the current pulse into a first shaped pulse having a first shape and a first characteristic parameter;
    transforming, with a second circuitry, the current pulse into a second shaped pulse having a second shape and a second characteristic parameter
    determining, with a third circuitry, a difference between the first characteristic parameter and the second characteristic parameter, thereby determining a relation between the first characteristic parameter and the second characteristic parameter;

determining, with a fourth circuitry, a difference between a shape of a reference current pulse and a shape of the current pulse as a function of the relation between the first characteristic parameter and the second characteristic parameter; and counting, with a fifth circuitry, a number of times the difference between the shape of the reference current pulse and the shape of the current pulse satisfies a threshold.

3. The pulse processing circuit according to claim 1, wherein at least one of the first shaped pulse or the second shaped pulse comprises a convolution of the current pulse with a Gaussian function and/or a bipolar function.

4. The method according to claim 2, wherein the difference of the shape of the current pulse from the reference is counted if the relation between the characteristic parameters generates a value which is outside a specified range around a reference value deduced from the reference current pulse.

5. The method according to claim 4, wherein the first characteristic parameter and the second characteristic parameter is selected from the group further consisting of a pulse height, and the relation between the first characteristic parameter and the second characteristic parameter is a quotient.

6. The method according to claim 4, wherein the characteristic first characteristic parameter and the second characteristic parameter is selected from the group further consisting of a time to which a pulse maximum occurs, and the relation between the first characteristic parameter and the second characteristic parameter is a temporal interval.

7. The method according to claim 2, further comprising:
transforming, with a sixth circuitry, the current pulse into a third shaped pulse, wherein the third shaped pulse comprises at least two extremes.

8. The method according to claim 7, wherein the third shaped pulse is bipolar.

9. The method according to claim 7, further comprising:
determining a height of the third shaped pulse with respect to at least one positive threshold and at least one negative threshold.

10. The method according to claim 7, further comprising:
detecting a deviation of the number of extremes of the third shaped pulse from a set of reference values.

11. The method according to claim 2, further comprising:
determining at least one height of the current pulse and/or at least one height of at least one of the at least two shaped pulses.

12. The pulse processing circuit according to claim 1, wherein the number of counted current pulses is corrected by taking the number of times the difference between the shape of the reference current pulse and the shape of the current pulse satisfies the threshold.

13. The pulse processing circuit according to claim 12, wherein the fifth circuitry is used to deduce a corrected total count rate of photons.

14. The method according to claim 2, wherein a photon energy is derived from the current pulse and corrected by taking the number of times the difference between the shape of the reference current pulse and the shape of the current pulse satisfies the threshold into account.

15. An imaging system comprising:
a radiation source configured to emit radiation;
a converter with at least one piece of converter material configured to generate an electrical charge when a photon of the emitted radiation interacts with the converter material;
an electrode configured to generate a current pulse induced by the electrical charge;
an application specific integrated circuit comprising:
a first circuitry configured to transform the current pulse into a first shaped pulse having a first shape and a first characteristic parameter, wherein the first characteristic parameter is selected from the group consisting of a pulse value at a given point in time, a temporal interval, a point in time, and an integral;
a second circuitry configured to transform the current pulse into a second shaped pulse having a second shape and a second characteristic parameter, wherein the first shape and the second shape are different;
a third circuitry configured to determine a difference between the first characteristic parameter and the second characteristic parameter, thereby determining a relation between the first characteristic parameter and the second characteristic parameter;
a fourth circuitry configured to compare a reference characteristic of a reference current pulse to the determined relation between the first characteristic parameter and the second characteristic parameter, thereby determining a difference between the reference characteristic and the determined relation between the first characteristic parameter and the second characteristic parameter; and
a fifth circuitry configured to count a number of times the determined difference between the reference characteristic and the determined relation between the first characteristic parameter and the second characteristic parameter satisfy a threshold; and
a reconstructor configured to process the number of times the determined difference between the reference characteristic and the determined relation between the first characteristic parameter and the second characteristic parameter satisfy a threshold thereby generating projection image data.

* * * * *